Patented Dec. 29, 1936

2,066,189

UNITED STATES PATENT OFFICE 2,066,189

PROCESS FOR PRODUCTION OF THIO-ETHERS FROM MERCAPTANS

William Seaman, Glens Falls, N. Y., and John R. Huffman, Elizabeth, N. J., assignors to Standard Oil Development Company, a corporation of Delaware No Drawing. Application January 6, 1932, Serial No. 585,156

4 Claims. (Cl. 260—151)

This invention relates to new and improved catalytic process for the conversion of mercaptans to thioethers. This reaction has been described by Sabatier who stated that it was catalyzed by powdered cadmium sulphide. We have now found that while cadmium sulphide shows fairly good initial catalytic properties for this reaction it nevertheless decreases very rapidly in activity and becomes a very poor catalyst within a period of a few hours or less. We have found that many other substances possess greater catalytic activity for this mercaptan conversion than cadmium sulphide, particularly after the latter has been in use for a short time, and that these substances retain their activity for a period many times longer than the active life of cadmium sulphide. These materials are classed, for the purpose of this invention, as catalysts of substantially constant catalytic activity.

While many of the more active catalysts for this reaction, when used to promote the reaction of substantially pure mercaptans at ordinary pressure, cause excessive losses due to fixed gas formation and undesirable side reactions, there are means whereby even the most active catalysts may be used to advantage for production of maximum yields of thioethers. These means will be described below.

The sulphides of the following metals have been found to be suitable catalysts for the conversion of mercaptans to thioethers: copper, magnesium, calcium, mercury, zinc, strontium, barium, aluminum, tin, lead, cerium, bismuth, tungsten, chromium, manganese, iron, cobalt and nickel.

These sulphides may be prepared from the oxides with hydrogen sulphide at suitably elevated temperatures or they may be formed in use during the reaction and it is understood that our invention includes also the use of the corresponding oxides, carbonates, and the like, which may be converted wholly or partly to sulphides while in use. The sulphides may also be prepared by precipitation with hydrogen sulphide from solutions of salts of the respective metals, or by other suitable methods generally used for preparation of metallic sulphides. We have found that the activity of these catalysts is aided by distributing them upon activated carbon which also shows desirable catalytic properties when used alone. Other supports may be used in place of the activated carbon; silica gel, asbestos, granular or finely divided aluminum, aluminum oxide and the like are mentioned illustratively.

Our improved catalysts may be used for the conversion of alkyl mercaptans such as methyl, ethyl, propyl, butyl, amyl, and higher mercaptans and aryl mercaptans such as phenyl and the like. The catalysts may be used with single pure mercaptans with the formation chiefly of the corresponding thioethers, or mixtures of mercaptans may be used and both symmetrical and mixed thioethers are then produced. We have found our catalysts particularly suitable for use in converting the mixtures of mercaptans derived from petroleum. These mercaptans may be suitably recovered from petroleum by any known means such as by treating light cracked naphthas with aqueous alkaline solutions and subsequently distilling the spent solution with steam. While such mixtures of mercaptans as secured from petroleum may be passed directly over our catalyst, improved results are generally secured if the mixture is divided into fractions with a boiling range corresponding to only one or two mercaptans. For example, a fraction boiling below 50° C., and consisting substantially of methyl and ethyl mercaptans, is preferably treated at somewhat higher temperatures than the fraction boiling between 50 and 75° C., or above 75° C.

Ordinarily the mercaptan conversion to thioethers does not go to completion and an appreciable amount of mercaptan appears to be present even under equilibrium conditions. Furthermore the equilibrium is reached only very slowly and it is accordingly not desirable to attempt to secure a maximum conversion in one pass through the reactor. We therefore prefer to operate with a reasonably low time of contact so as to secure about 50 to 65% conversion to thioethers per pass and to recycle the unconverted mercaptans over the catalyst.

The following examples are given to indicate a few of our specific catalysts:

1. 18 cc. of vaporized mercaptan, boiling between 30° C. and 40° C., and prepared by steam distillation of spent soda used for treating a sour light naphtha, are passed per hour at about 305° C. over 100 cc. of a catalyst consisting of precipitated cadmium sulphide distributed on activated charcoal. 56.6% of thioethers are secured in the product, based on the amount of mercaptans used, with 2.3% loss due to gas formation.

2. At a rate of 13 cc. of the same mercaptan fraction per hour and a temperature of 337° C. over the same catalyst as in Example 1, a 61.5% yield of thioethers is secured with 19% gas loss. The gas loss is due principally to the formation of olefines.

3. Using a catalyst consisting of 1 part of zinc sulphide to 3 parts of activated charcoal, a yield of 51.0% of thioethers with 10% gas loss is secured at 310° C. with a space velocity (grams of mercaptans per cc. of catalyst per hour) of 0.15.

4. A 31% yield of thioethers is secured with a 0.26 space velocity at 293° C. with a cobalt sulphide catalyst.

5. A 45.5% yield of thioethers with only 5.1% gas loss is secured at 0.36 space velocity and 312° C. with a ferrous sulphide catalyst.

6. A 56.2% yield of thioethers with 3.1% gas loss is secured at 0.28 space velocity and 307° C. with a tin sulphide catalyst.

7. A 49.8% yield of thioethers with 2.4% gas loss is secured at a space velocity of 0.29 and a temperature of 310° C. with a bismuth sulphide catalyst.

While the processes in the above examples were conducted at atmospheric pressure it is well understood that other pressures, both above or below atmospheric, may be used and that pressures above atmospheric are advantageous in that the loss to side reactions is diminished. The reaction is preferably conducted in vapor phase, and the maximum pressure which may be used therefore depends upon the reaction temperature and the boiling range and partial pressure of the mercaptans used.

Our invention is not to be limited to any specific disclosure given above merely by way of example, nor to any theory of the activity of our catalysts, nor to the mechanisms of the reactions, but only by the following claims in which we wish to claim all novelty as far as the prior art permits.

We claim:

1. Process for preparing thioethers, which comprises contacting mercaptans at a suitable reaction temperature with a catalyst essentially comprising a sulfide of the group zinc, tin, bismuth, aluminum, and iron.

2. Process for preparing thioethers, which comprises contacting a mixture of mercaptans derived from petroleum at a suitable reaction temperature with a catalyst essentially comprising cadmium sulfide distributed on activated charcoal.

3. Process for preparing thioethers, which comprises contacting a mixture of mercaptans derived from petroleum at a suitable reaction temperature with a catalyst essentially comprising zinc sulfide distributed on activated charcoal.

4. A process for the production of thioethers which comprises contacting mercaptans at a suitable reaction temperature with a catalyst essentially comprising a compound selected from the group consisting of sulfides and compounds readily convertible into sulfides by hydrogen sulfide under the reaction conditions of metals of groups II to VIII of the periodic system deposited on activated charcoal.

WILLIAM SEAMAN.
JOHN R. HUFFMAN.